US011971867B2

(12) United States Patent
Bedi et al.

(10) Patent No.: US 11,971,867 B2
(45) Date of Patent: *Apr. 30, 2024

(54) GLOBAL COLUMN INDEXING IN A GRAPH DATABASE

(71) Applicant: Amazon Technologies, Inc., Seattle, WA (US)

(72) Inventors: Kawarjit Bedi, Sammamish, WA (US); Piyush Gupta, Issaquah, WA (US); Xingbo Wang, Kirkland, WA (US); Sainath Chowdary Mallidi, Seattle, WA (US); Andi Gutmans, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,839

(22) Filed: Dec. 22, 2022

(65) Prior Publication Data

US 2023/0127055 A1  Apr. 27, 2023

Related U.S. Application Data

(63) Continuation of application No. 17/067,487, filed on Oct. 9, 2020, now Pat. No. 11,544,243, which is a
(Continued)

(51) Int. Cl.
*G06F 16/22* (2019.01)
*G06F 16/2453* (2019.01)
*G06F 16/901* (2019.01)

(52) U.S. Cl.
CPC ........ *G06F 16/221* (2019.01); *G06F 16/2453* (2019.01); *G06F 16/9024* (2019.01)

(58) Field of Classification Search
CPC . G06F 16/221; G06F 16/2453; G06F 16/9024
See application file for complete search history.

(56) References Cited

U.S. PATENT DOCUMENTS 9,330,138 B1   5/2016  Shankar et al.
9,378,241 B1   6/2016  Shankar et al.
(Continued)

OTHER PUBLICATIONS

Marko A. Rodriguez, "The Gremlin Graph Traversal Machine and Language", Proceedings of the 2015 ACM Database Programming Languages Conference, Aug. 2015, Retrieved from URL: https://arxiv.org/pdf/1508.03843v1.pdf, pp. 1-10.
(Continued)

*Primary Examiner* — Robert W Beausoliel, Jr.
*Assistant Examiner* — Mohammad S Bhuyan
(74) *Attorney, Agent, or Firm* — Robert C. Kowert; Kowert, Hood, Munyon, Rankin & Goetzel, P.C.

(57) ABSTRACT

Methods, systems, and computer-readable media for global column indexing in a graph database are disclosed. A plurality of data elements of a graph database are stored. The triples comprise identifiers, column names, and values. The column names are globally scoped in the graph database and are associated with data types. Indices corresponding to the column names are created. A particular one of the indices comprises one or more of the values associated with the corresponding column name. A query is performed on the graph database using one or more of the indices corresponding to one or more of the column names associated with the query.

20 Claims, 9 Drawing Sheets

Related U.S. Application Data continuation of application No. 15/360,872, filed on Nov. 23, 2016, now Pat. No. 10,803,034.

(56) References Cited

U.S. PATENT DOCUMENTS

| | | | |
|---|---|---|---|
| 9,477,779 | B2 | 10/2016 | Webber et al. |
| 10,803,034 | B2 | 10/2020 | Bedi et al. |
| 11,222,072 | B1 | 1/2022 | Bourne |
| 11,544,243 | B2 | 1/2023 | Bedi et al. |
| 2003/0135495 | A1 | 7/2003 | Vagnozzi |
| 2003/0182276 | A1 | 9/2003 | Bossman et al. |
| 2005/0234900 | A1 | 10/2005 | Bossman et al. |
| 2009/0024654 | A1 | 1/2009 | Zhao et al. |
| 2011/0264666 | A1* | 10/2011 | Gieseke .............. G06F 16/2228 707/E17.085 |
| 2014/0032566 | A1 | 1/2014 | Agarwal et al. |
| 2014/0289223 | A1 | 9/2014 | Colwell et al. |
| 2014/0304251 | A1 | 10/2014 | Bornea et al. |
| 2014/0310302 | A1 | 10/2014 | Wu et al. |
| 2014/0351261 | A1 | 11/2014 | Aswani |
| 2015/0052134 | A1 | 2/2015 | Bornea et al. |
| 2016/0092527 | A1 | 3/2016 | Kang |
| 2016/0275201 | A1 | 9/2016 | Li et al. |
| 2016/0342708 | A1 | 11/2016 | Fokoue-Nkoutche |
| 2018/0113926 | A1 | 4/2018 | Llaves et al. |

OTHER PUBLICATIONS

Marko A. Rodriguez, "The Benefits of the Gremlin Graph Traversal Machine", Datastax.com, Sep. 2015, Retrieved from URL: http://www.datastax.com/dev/blog/the-benefits-of-the-gremlin-graph-traversal-machine, pp. 1-11.

Justin J. Miller, "Graph Database Applications and Concepts with Neo4j", Proceedings of the Southern Association for Information Systems Conference, Mar. 2013, pp. 141-147.

Jiewen Huang, et al., "Scalable SPARQL Querying of Large RDF Graphs", Proceedings of the VLDB Endowment, vol. 4, No. 11, Sep. 2011, pp. 1-12.

International Search Report and Written Opinion from PCT/US2017/063089, dated Feb. 12, 2018, Amazon Technologies, Inc., pp. 1-11.

David C. Faye, et al., "A survey of RDF storage approaches", Revue Africaine de la Recherche en Informatique et Mathematics, pp. 1-25.

Yongming Luo, et al., "Chapter 1—Storing and Indexing Massive RDF Data Sets", Jan. 1, 2012, Retrieved from URL: http://www.win.tue.nl/'ylou/seeqr/files/11survey.pdf, pp. 1-32.

Sunitha Abburu, et al., Effective Partitioning and Multiple RDF Indexing for Database Triple Store, Engineering Journal, vol. 19, Issue 5, Oct. 31, 2018, pp. 1-16.

Hannah Blau et al., "A Visual Language for Querying and Updating Graphs", dated Feb. 29, 2004, Retrieved from URL https:www.researchgate.net/publication/2924449, pp. 1-13.

Sebastian Ferre Ed , et al., "Squall: A Controlled Natural Language for Querying and Updating RDF Graphs", dated Aug. 29, 2012, Copyright Spring-Verlag Berlin Heidelberg, pp. 1-15.

* cited by examiner

GLOBAL COLUMN INDEXING IN A GRAPH DATABASE

This application is a continuation of U.S. patent application Ser. No. 17/067,487, filed Oct. 9, 2020, which is a continuation of U.S. patent application Ser. No. 15/360,872, filed Nov. 23, 2016, now U.S. Pat. No. 10,080,304, which are hereby incorporated by reference herein their entirety.

BACKGROUND

As an increasing amount of data is generated, the need for storage and analysis of such data is similarly growing. In varied domains such as social media, mobile and messaging apps, web portals, and the Internet of Things (IoT), data may be both rich and highly connected. New relationships between data elements may be created at a high rate, and effective analysis of such data may often include analysis of the relationships. For example, modeling a social network may include modeling relationships between people. The relationships may change over time, and information relating to the people themselves may be added or modified over time as well. Applications that seek to analyze such information may require prompt answers to complex questions regarding networks of relationships, such as purchases or preferences relating to friends of a particular person.

Figure 1:
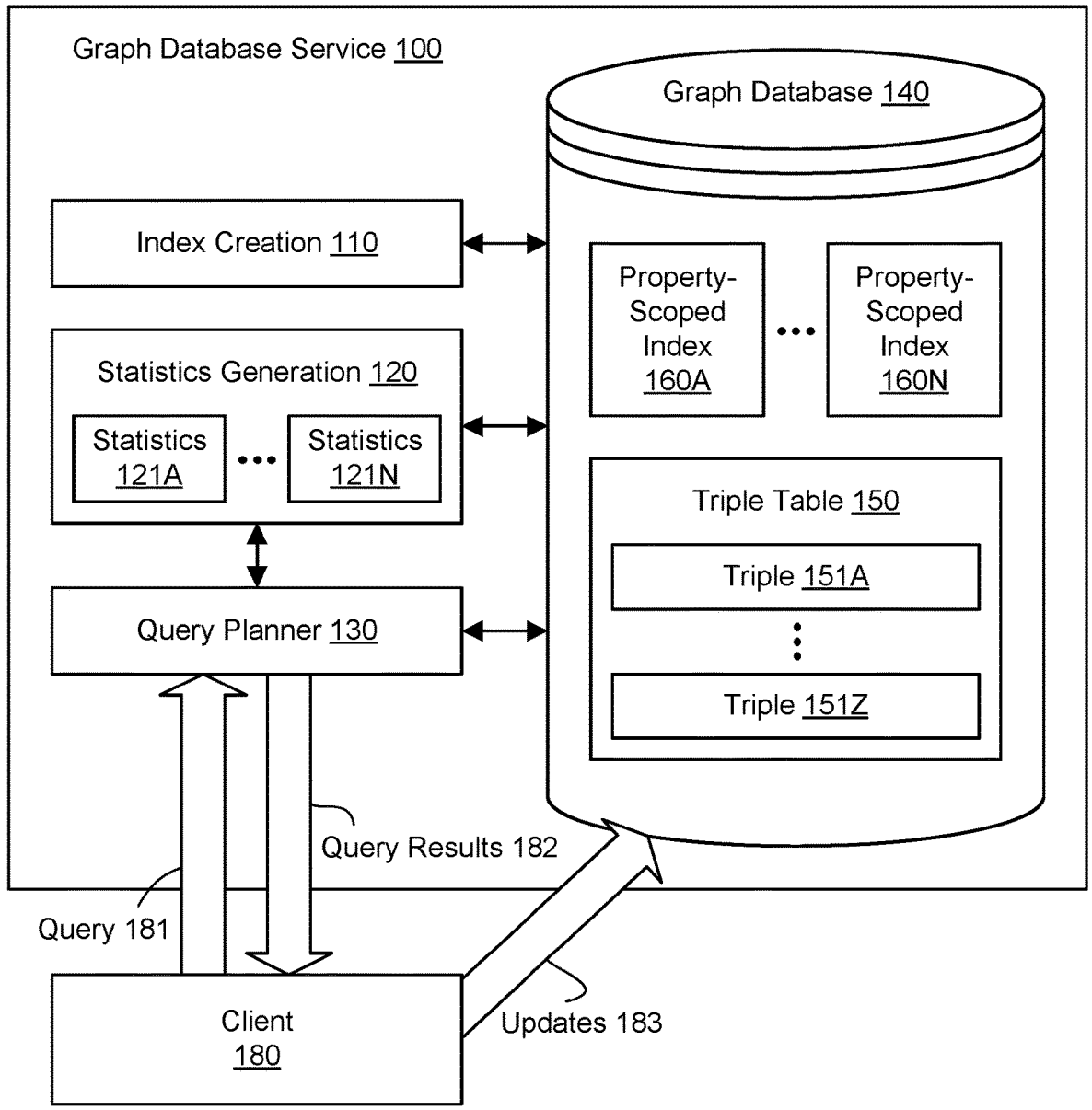
FIG. 1 illustrates an example system environment for global column indexing in a graph database, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for global column indexing in a graph database are described. In one embodiment, a graph database service stores elements of data in a graph database. In one embodiment, elements of data in the graph database may represent triples or rows. In one embodiment, for example, a triple may include a subject identifier, a column name, and a value. In one embodiment, the triples in a graph database may be used to represent nodes and edges (relationships) in a graph of connected items. In one embodiment, columns are strongly typed such that values in a particular column may share the same data type. In one embodiment, column names are globally scoped in the graph database, such that the same column name may not be represented more than once in the graph database and may not be limited to a particular sub-table of the graph database. In one embodiment, the graph database service uses a partitioned indexing scheme to enable querying of the graph database. In one embodiment, indices are created and maintained for global columns in the primary table in the graph database. In one embodiment, a per-column index may be a table or other columnar data structure that includes multiple rows, and each row may include the values associated with the column corresponding to the index. In one embodiment, the indices may effectively be partitioned by column name. In one embodiment, the generation and maintenance of indices is performed by the graph database service automatically, e.g., without being directly prompted by user input directing the indexing tasks. In one embodiment, the per-column indices are used to perform queries of the graph database. In one embodiment, to perform a query, a query planner may refer to the indices corresponding to columns associated with the query. In one embodiment, statistics are generated and maintained for the indices in order to optimize queries. In one embodiment, the statistics for an index may represent distributions of values within the corresponding column. In one embodiment, to optimize a query, the order of indices to be used may be determined based (at least in part) on the statistics for the per-column indices. In one embodiment, statistics may be maintained automatically and in real time or near-real time to enable optimized query processing using up-to-date information.

FIG. 1 illustrates an example system environment for global column indexing in a graph database, according to one embodiment. In one embodiment, a graph database service 100 stores elements of data in a graph database 140. In one embodiment, the graph database may also be referred to as a graph data store or a triple store. In one embodiment, a graph represented by the graph database service is a data structure that is suitable for representing relationships, connections, and dependencies within data. In one embodiment, typical examples of domains in which graphs can model data may include social networks or communication networks, biological networks, time series applications, and metadata management. In one embodiment, a graph may include nodes (vertices) and edges (relationships) as well as properties associated with those vertices and edges. In one embodiment, a node may represent a concept or an object. In one embodiment, an edge may represent a relationship between vertices. In one embodiment, a vertex may have various properties such as a name. In one embodiment, an edge may have various properties such as a type of relationship. In one embodiment, for example, in a graph within a social network, User1, User2, and User3 may be entities, and a "friendOf" relationship between them may define the "edges" of this small graph. In one embodiment, the User1, User2, and User3 entities may have properties like "name" and "age," and the relationship properties may include "start date," "source," and so on. In one embodiment, large volumes of such connected data may be generated from modern applications, mobile and messaging apps, and IoT devices. In one embodiment, such data tends to be dynamic, such that the relationships, entities, and their properties may be constantly changing.

Schema-based relational data stores may not be able to change rapidly enough; schema-less stores like key-value stores may be unable to work with sophisticated query languages. Traditional key-value data stores and relational data stores may often be unwieldy for managing data that is rich and highly connected. In one embodiment, for example, key-value stores may support accessing discrete objects that do not necessarily represent rich data or relationships. As another example, relational data stores may be too inflexible to adequately represent the fluid relationships in highly connected data. When relational databases are used to store such data, developers may be required to store the data in tables with rigid structures and write complex SQL queries using multiple joins. Such complex queries may prove difficult to maintain and may not scale adequately when run on large datasets. As the data scale increases, some graphs may become billion-edge structures that challenge prior hardware and software solutions. In one embodiment, the graph database service may query such data efficiently using per-column (property-scoped) indices 160A-160N. Although indices 160A-160N are illustrated for purposes of example, any suitable number and configuration of indices may be used in the graph database in various embodiments.

In one embodiment, the elements of data in the graph database may represent triples or rows in a columnar format. In one embodiment, triples such as triples 151A through 151Z may be stored in a triple table 150; the triple table may represent a primary table in the graph database. Although triples 151A-151Z are illustrated for purposes of example, any suitable number and configuration of triples may be used in the graph database in various embodiments. In one embodiment, for example, a triple may include an identifier, a column name, and a value. In one embodiment, triples may include different elements than (e.g., in addition to or instead of) an identifier, column, name, and value. In one embodiment, the identifier may also be referred to as a subject identifier. In one embodiment, the identifier may indicate the particular row (e.g., in a relational view of the data) or record that holds the combination of the column name and the value in the triple. In one embodiment, the same subject identifier may be reused for multiple triples, e.g., if the corresponding row or record includes values in multiple categories. In one embodiment, the column name may indicate a distinct and separate category of data, and the value may represent one of the allowable values within the category. In one embodiment, the triples in a graph database may be used to represent nodes and edges (relationships) in a graph of connected items. In one embodiment, the graph database may store one graph or multiple graphs. In one embodiment, the triples are also stored with graph identifiers that indicate particular graphs or sub-graphs to which the triples belong.

In one embodiment, columns are strongly typed such that values in a particular column may share the same data type, and an enforcement mechanism may ensure that values in the particular column are limited to being expressed in the data type associated with the column. In one embodiment, data types may differ from column to column. In one embodiment, all the rows and columns in the graph database may effectively belong to the same primary table, e.g., the triple table. In one embodiment, column names are globally scoped in the graph database, such that the same column name may not be represented more than once in the graph database and may not be limited to a particular sub-table of the graph database. In one embodiment, by way of contrast, column names in a conventional relational database are typically locally scoped to one of many tables.

In one embodiment, the graph database service uses a partitioned indexing scheme to enable querying of the graph database. In one embodiment, an index creation component 110 may create and maintain indices for every global column in the primary table in the graph database. In one embodiment, the index creation component 110 may create and maintain indices for many but not necessarily all global columns in the primary table in the graph database, e.g., for columns that are intended to be queryable or searchable. In one embodiment, a per-column index may be a table or other columnar data structure that includes multiple rows, and each row may include the values associated with the column corresponding to the index. In one embodiment, a per-column index may also be referred to as a property-scoped index. In one embodiment, each row in a per-column index also includes a pointer to the corresponding row in the primary table in the graph database. In one embodiment, the indices 160A-160N may be stored as separate data structures from each other and from the triple table 150, e.g., in storage managed by or otherwise accessible to the graph database service. In one embodiment, the indices may effectively be partitioned by column name. In one embodiment, by way of contrast, such per-column indexing in a conventional relational database would often be prohibitively expensive due to the vastly greater number of locally scoped columns that may be managed in a relational database management system. In one embodiment, the generation and maintenance of indices is performed by the graph database service automatically, e.g., without being directly prompted by user input directing the indexing tasks. In one embodiment, by way of contrast, the generation and maintenance of indices for a conventional relational database is typically a manual task that requires user input to customize the indices.

In one embodiment, the per-column indices are used to perform queries of the graph database. In one embodiment, a client 180 may supply a query 181 and receive query results 182 from the graph database service. In one embodiment, to perform a query, a query planner 130 may refer to the indices corresponding to columns associated with the query. In one embodiment, a statistics generation component 120 generates and maintains statistics for the indices in order to optimize queries. In one embodiment, the statistics generation component 120 generates and maintains sets of statistics corresponding to individual indices, such as statistics 121A-121N corresponding to the indices 160A-160N. In one embodiment, the statistics may be stored using any suitable storage technologies, e.g., in storage managed by or otherwise accessible to the graph database service. In one embodiment, the statistics for an index may represent distributions of values within the corresponding column. In one embodiment, for example, the statistics may indicate how many times a particular value occurs within the column, how many triples having numeric values within a particular numeric range occur within the column, how many triples having string-typed values beginning with a particular character occur within the column, and so on.

In one embodiment, to optimize a query, the order of indices to be used may be determined based (at least in part) on the statistics for the per-column indices. In one embodiment, the query planner uses the most constraining index first, then the next most constraining index, and so on. In one embodiment, the statistics may be maintained in real time or near-real time to enable optimized query processing using up-to-date information. In one embodiment, the generation and maintenance of statistics for an index is performed by the graph database service automatically, e.g., without being directly prompted by user input directing the statistics tasks. In one embodiment, the client 180 may supply updates 183 to triples in the graph database. In one embodiment, an index and the statistics for the index are generated or updated by the graph database service in response to the updating of one or more triples for the corresponding column in the graph database (e.g., the addition of one or more triples, the deletion of one or more triples, or the modification of one or more triples). In one embodiment, the graph database service provides a query hint mechanism to optimize the performance of individual queries within specific applications.

In one embodiment, queries of the graph database include semantic queries. In one embodiment, a semantic query may permit the retrieval of both explicitly and implicitly derived information from the graph database based on syntactic, semantic, and structural information embodied in the database. In one embodiment, a semantic query may return a specific or precise result such as a single piece of information. In one embodiment, a semantic query may return an answer to a "fuzzier" or less specific question through pattern matching and machine logic. In one embodiment, by operating on the triples in the graph database, a semantic query may process the actual relationships between information and determine an answer from the network of connections in the graph database. In one embodiment, a semantic query may operate on structured data and utilize features such as operators (e.g., >, <, and =), pattern matching, and so on. In one embodiment, semantic queries of the graph database are formatted in the syntax of a semantic query language such as SPARQL. In one embodiment, a semantic query may be written without knowledge of a database schema in the graph database. In one embodiment, a query of the graph database may be expressed in a graph traversal language or graph query language such as Neo4j or Gremlin.

In one embodiment, the graph database is designed to effectively capture and analyze rich, dynamic data structures having complex relationships. In one embodiment, for example, a simple social query such as "find all the friends of User1's friends" may be expressed as a one-line traversal in a graph database in a graph traversal language such as Gremlin: g.V( ).has('name','User1').out('friend').out ('friend').values('name'). However, using an SQL query to retrieve the same information from a relational database may be much more complex, such as the following query:

SELECT p1.Person AS PERSON, p2.Person AS FRIEND_OF_FRIEND
FROM PersonFriend pf1 JOIN Person p1
ON pf1.PersonID=p1.ID JOIN PersonFriend pf2
ON pf2.PersonID=pf1.FriendID JOIN Person p2
ON pf2.FriendID=p2.ID
WHERE p1.Person='User1' AND pf2.FriendID< >p1.ID In one embodiment, the graph database service may support a simple text search on property values. In one embodiment, in the property graph model, the text search may search over node and edge properties. In one embodiment, in the resource description framework (RDF) model, the text search may search over literal values. In one embodiment, the graph database service may employ logic to efficiently compress and store the data so that the storage costs are lowered.

In one embodiment, the graph database service may be used by clients in varying domains such as social networks, recommendation engines, data management, network and IT management, fraud detection, medical applications, Online Transaction Processing (OLTP) and Online Analytics Processing (OLAP) workloads, and so on. In one embodiment, the graph database service may be used for processing of streaming data that is rich (e.g., representing a large amount of information) and highly connected (e.g., representing many relationships). In one embodiment, for example, clients in the financial sector may use the graph database service to process a stream of credit card transactions as graph queries to identify potential anomalies. In one embodiment, as a more specific example, a client of the graph database service may supply a graph query to detect a purchase that takes place in one geographical region and is followed by one in another geographical region five minutes later. In one embodiment, detecting that a customer had two transactions that occurred closely together, but took place thousands of miles apart, the client of the graph database service may generate an alert and send it to the customer. In one embodiment, as another example, the graph database service may be used by a retail company to make purchase recommendations for a customer based on purchasing behavior of the customer's friends. In one embodiment, as yet another example, the graph database service may be used by a life sciences organization to analyze the relationships between different chemicals and compounds to detect drug interactions.

In one embodiment, the graph database service may be used by clients for combining and analyzing the large quantities of relationship information aggregated in the clients' OLTP and OLAP applications. In one embodiment, beyond short interactive queries (e.g., for OLTP) and longer-running complex queries (e.g., for OLAP), graph analytics using the graph database service may produce new insights by analyzing entire collections of relationships. In one embodiment, graph analytics may use iterative algorithms to process very large graphs and mine them for new information. In one embodiment, examples of such graph analytics may include using search engine algorithms for detecting web page relevance, using a community detection algorithm to detect groups of similar users from a large social network, and executing a shortest path algorithm to find the lowest cost route from point A to point B on a network of roads. Such tasks may be computationally challenging for conventional databases (e.g., relational databases) because they often require visiting all of the relationships (edges) in the graph multiple times to converge on a result.

In one embodiment, the graph database service supports incoming and outgoing streams of graph data. In one embodiment, the graph database service may be used in conjunction with machine-learning and deep-learning applications and services such that relationship-rich data in the graph database can be analyzed to identify areas in which to use machine-learning algorithms. In one embodiment, the graph database service may be used to represent and scale knowledge graphs. In one embodiment, the graph database service provides native support for processing large quantities of relationship information. In one embodiment, the graph database service natively supports both the property graph and resource description framework (RDF) graph models to permit flexibility in modelling data on behalf of clients. In one embodiment, queries may explore small parts of the graph (e.g. OLTP applications such as recommendation systems), explore large parts of the graph (e.g., lightweight OLAP applications such as fraud detection), or examine the whole graph repeatedly (e.g., graph analytics such as determining relevance via page rank).

In one embodiment, the graph database service provides support for multiple availability zones within a provider network; if the primary cluster node fails, the graph database service may automatically detect the failure, select one from the available standby cluster nodes, and promote the standby to become the new primary. In one embodiment, the graph database service may propagate the DNS changes of the promoted replica so that the client's application can keep writing to the primary endpoint. In one embodiment, the graph database service may also provision a new node to replace the promoted standby node in the same availability zone of the failed primary one. In case the primary node failed due to temporary availability zone disruption, the new replica may be launched automatically by the graph database service once that availability zone has recovered. In one embodiment, the graph database service supports snapshots (automatic and on-demand) that can be restored via the console and application programming interface (API).

In one embodiment, the client 180 may encompass any type of client suitable to submit data and requests to the graph database service. In one embodiment, the client may be one of many clients of the graph database service. In one embodiment, the client may include one or more services or applications that seek to make use of the graph database service. In one embodiment, the client may convey network-based service requests to the service via one or more networks. In various embodiments, the network(s) may encompass any suitable combination of networking hardware and protocols necessary to establish network-based communications between the client and the graph database service. In one embodiment, for example, the network(s) may generally encompass the various telecommunications networks and service providers that collectively implement the Internet. In one embodiment, the network(s) may also include private networks such as local area networks (LANs) or wide area networks (WANs) as well as public or private wireless networks. In one embodiment, for example, both the client and the graph database service may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client and the Internet as well as between the Internet and the graph database service. In one embodiment, the client may communicate with the graph database service using a private network rather than the public Internet.

Figure 7:
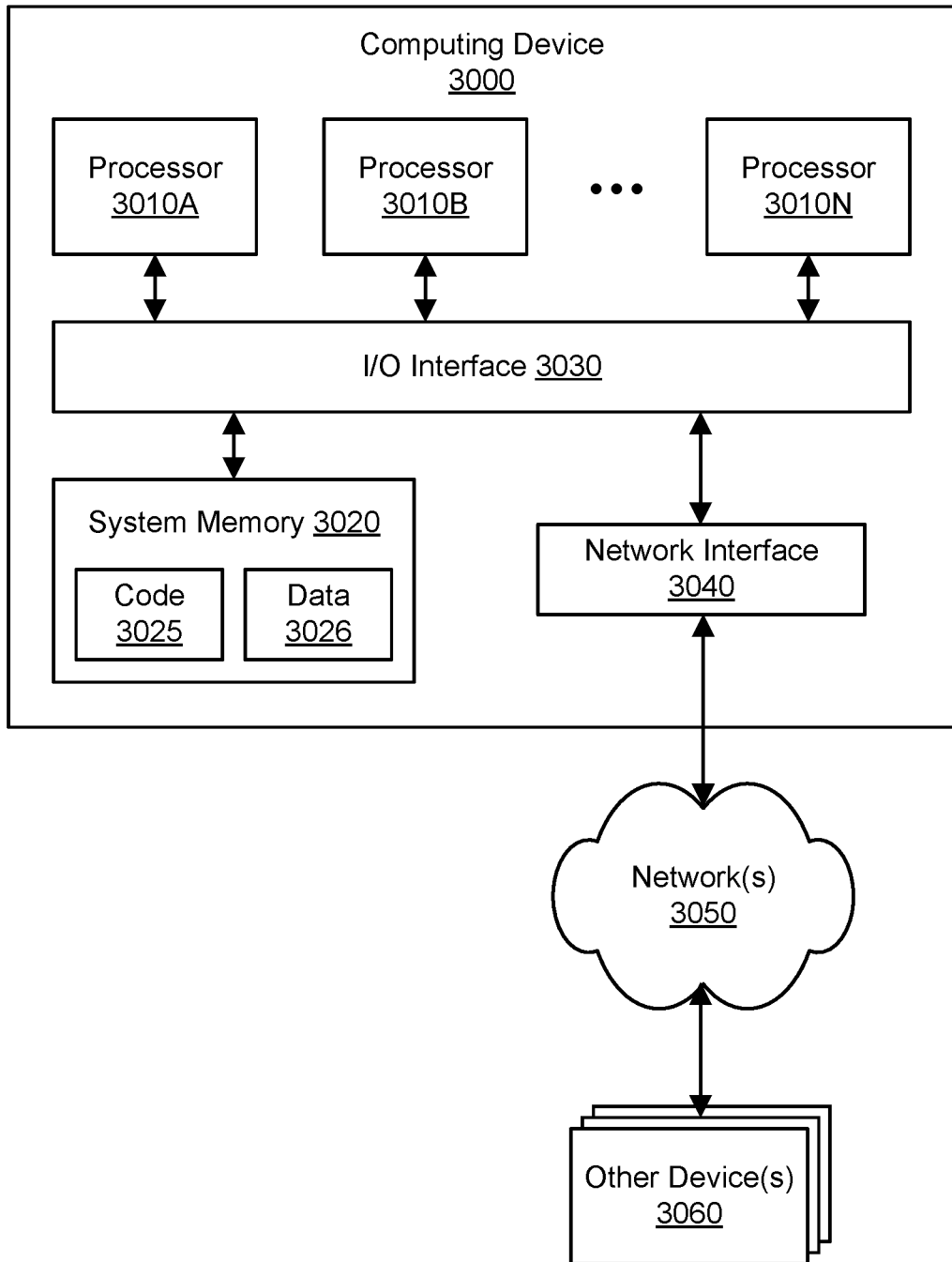
FIG. 7 illustrates an example computing device, according to one embodiment.

In one embodiment, the graph database service may include one or more computing devices, any of which may be implemented by the example computing device 3000 illustrated in FIG. 7, and any suitable storage resources. Similarly, in one embodiment, the client may be implemented using the example computing device 3000 illustrated in FIG. 7. In various embodiments, portions of the described functionality of the service 100, database 140, and/or client 180 may be provided by the same computing device or by any suitable number of different computing devices. In one embodiment, if any of the components are implemented using different computing devices, then the components and their respective computing devices may be communicatively coupled, e.g., via a network. In one embodiment, each of the illustrated components (such as the graph database service and its constituent components) may represent any combination of software and hardware usable to perform their respective functions. In various embodiments, the graph database service and/or graph database may include additional components not shown, fewer components than shown, or different combinations, configurations, or quantities of the components shown.

Figure 2A:
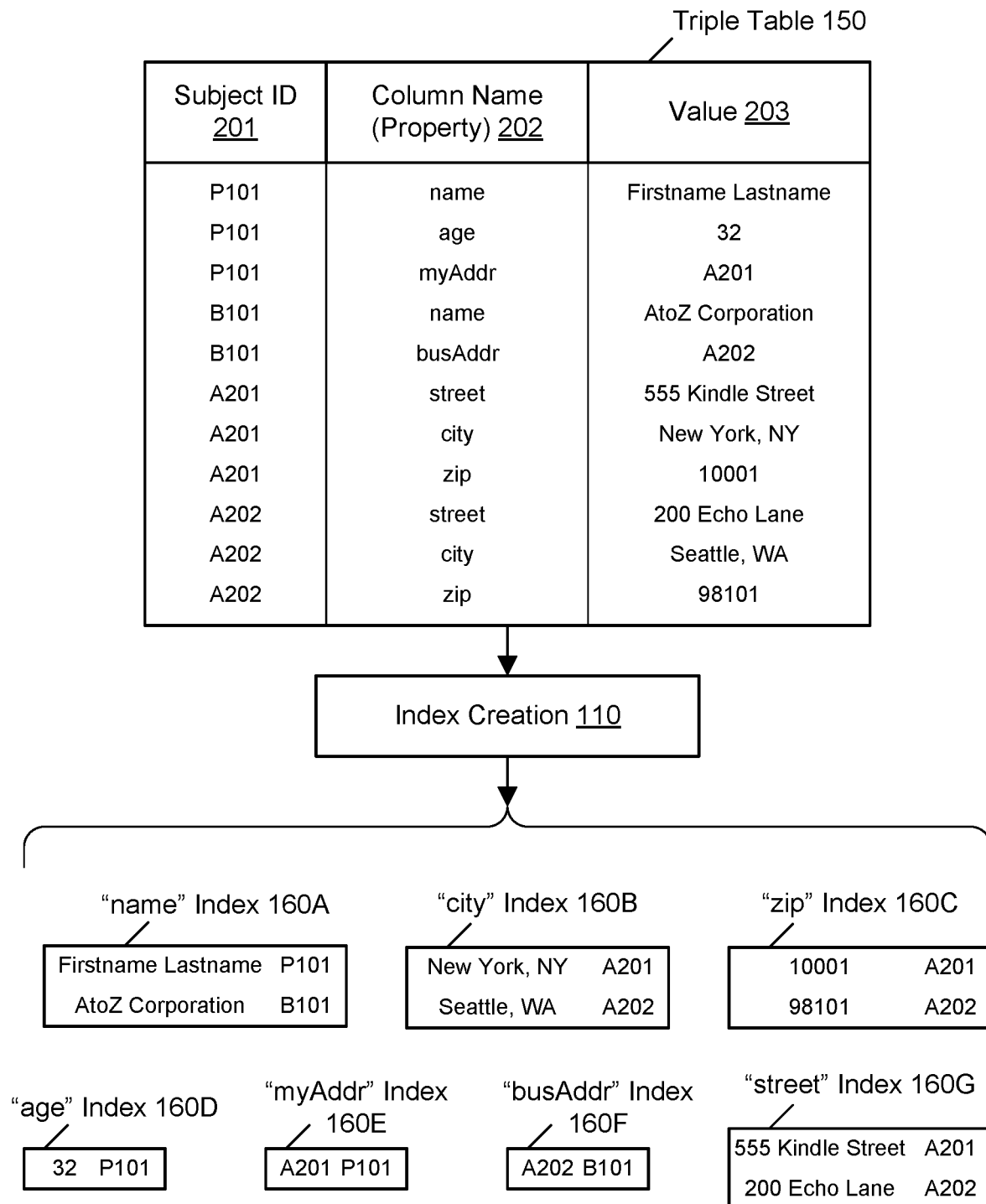
FIG. 2A through FIG. 2C illustrate examples of a graph database usable with the example system environment, including the creation of per-column indices for globally scoped column names, according to one embodiment.

FIG. 2A illustrates an example of a graph database usable with the example system environment, including the creation of per-column indices for globally scoped column names, according to one embodiment. In one embodiment, the graph database service stores data as triples in a triple table 150. In one embodiment, the triples used in the graph database service may differ from the triples in the RDF graph model, in which a triple may include a subject, predicate, and an object. In one embodiment, the storage model used by the graph database service can effectively store and process both the property graph model and the RDF model using its internal triples structure. In one embodiment, in the illustrated example, the triple table includes at least the illustrated eleven triples. In one embodiment, the triples include subject identifiers 201, column names or properties 202, and values 203 associated with the column names or properties. In one embodiment, the subject identifiers may be referred to as identifiers or row identifiers. In one embodiment, the identifiers 201 may indicate the particular row (e.g., in a relational view of the data) or record that holds the combination of the column name and the value in the triple. In one embodiment, as shown in the example of FIG. 2A, the same subject identifier may be reused for multiple triples, e.g., if the corresponding row or record includes values in multiple categories. In one embodiment, the column names or properties 202 may indicate a distinct and separate category of data, and the values 203 may represent one of the allowable values within the category. In one embodiment, the triples in the triple table may be used to represent nodes and edges (relationships) in a graph of connected items. In one embodiment, for example, the rows including identifier P101 may represent a node for a particular person having properties such as the name "Firstname Lastname" and the age 32. In one embodiment, the node for identifier P101 may also be connected to a node for a personal address (myAddr) A201. In one embodiment, as shown in the example, the address A201 has additional triples in the triple table indicating values for street address, city, and zip code properties. Similarly, in one embodiment, the rows including identifier B101 may represent a node for a particular business having properties such as the name "AtoZ Corporation" and a connection to a node for a business address (busAddr) A202.

In one embodiment, columns are strongly typed such that values in a particular column may share the same data type, and an enforcement mechanism may ensure that values in the particular column are limited to being expressed in the data type associated with the column. In one embodiment, data types may differ from column to column. In one embodiment, as shown in the example of FIG. 2A, the "name" column may be associated with a string data type, while the "zip" column may be associated with a numeric data type. In one embodiment, clients are permitted to create columns that appear to be locally scoped but are actually implemented in the graph database with a global scope, e.g., by automatically appending an additional term to a potentially non-unique column name to ensure that the combination is unique in the graph database.

In one embodiment, the index creation component may create and maintain indices for every global column in the triple table. In one embodiment, the index creation component may create and maintain indices for many but not necessarily all global columns in the triple table, e.g., for columns that are intended to be queryable or searchable. In one embodiment, as shown in the example of FIG. 2A, the index creation component may create and maintain a "name" index 160A corresponding to the column name or property "name," a "city" index 160B corresponding to the column name or property "city," a "zip" index 160C corresponding to the column name or property "zip," an "age" index 160D corresponding to the column name or property "age," a "myAddr" index 160E corresponding to the column name or property "myAddr," a "busAddr" index 160F corresponding to the column name or property "busAddr," and a "street" index 160G corresponding to the column name or property "street." In one embodiment, the per-column or property-scoped indices 160A-160G be tables or other columnar data structures that include one or more rows, and each row may include the values associated with the column corresponding to the index. In one embodiment, each row in a per-column index also includes a pointer to the corresponding row in the primary table in the graph database; the pointer may take the form of a subject identifier. In one embodiment, the indices may effectively be partitioned by column name. In one embodiment, by way of contrast, such per-column indexing in a conventional relational database would often be prohibitively expensive due to the vastly greater number of locally scoped columns that may be managed in a relational database management system. In one embodiment, the generation and maintenance of indices is performed by the graph database service automatically, e.g., without being directly prompted by user input directing the indexing tasks. In one embodiment, by way of contrast, the generation and maintenance of indices for a conventional relational database is typically a manual task that requires user input to customize the indices.

Figure 2B:
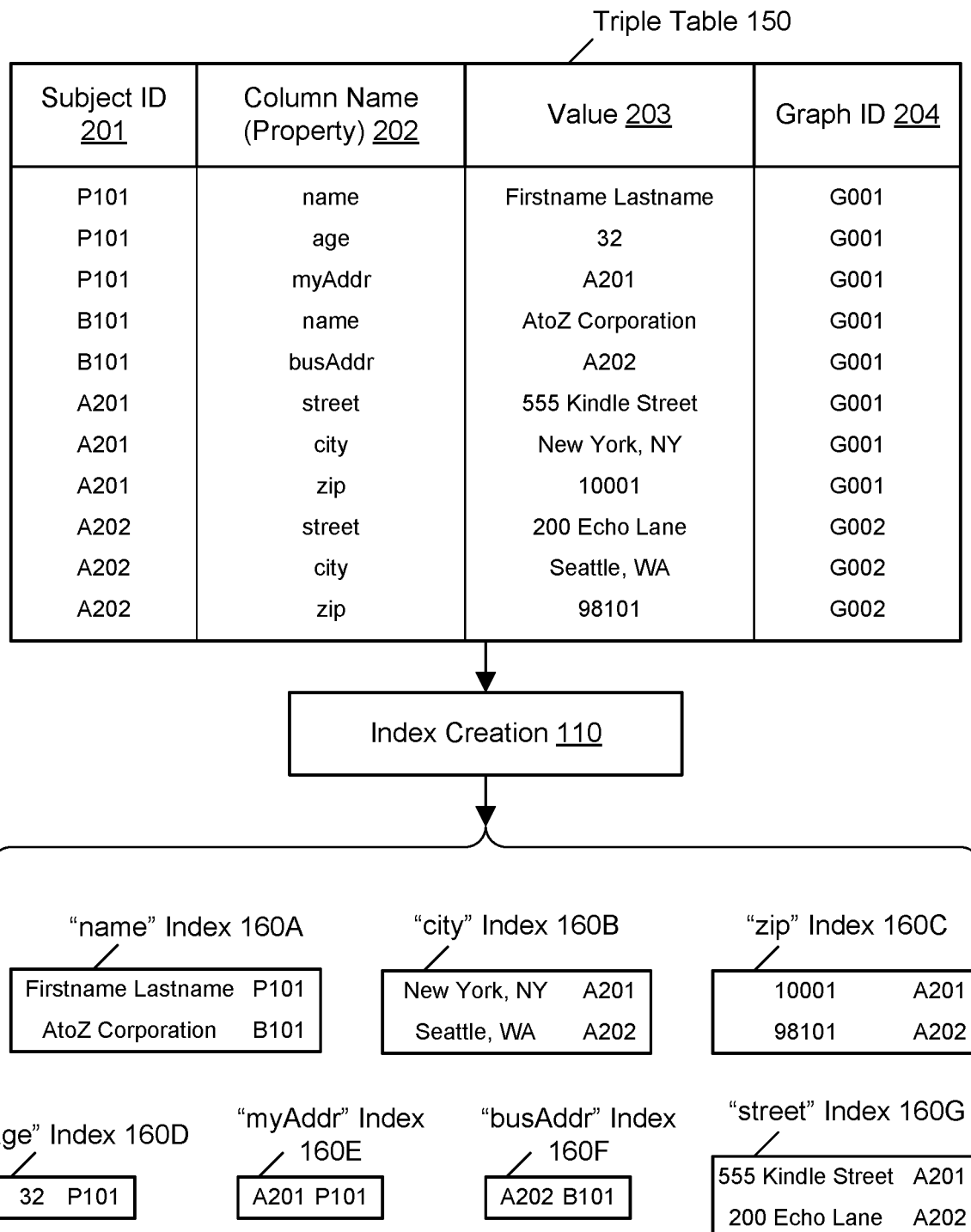
Figure 2C:
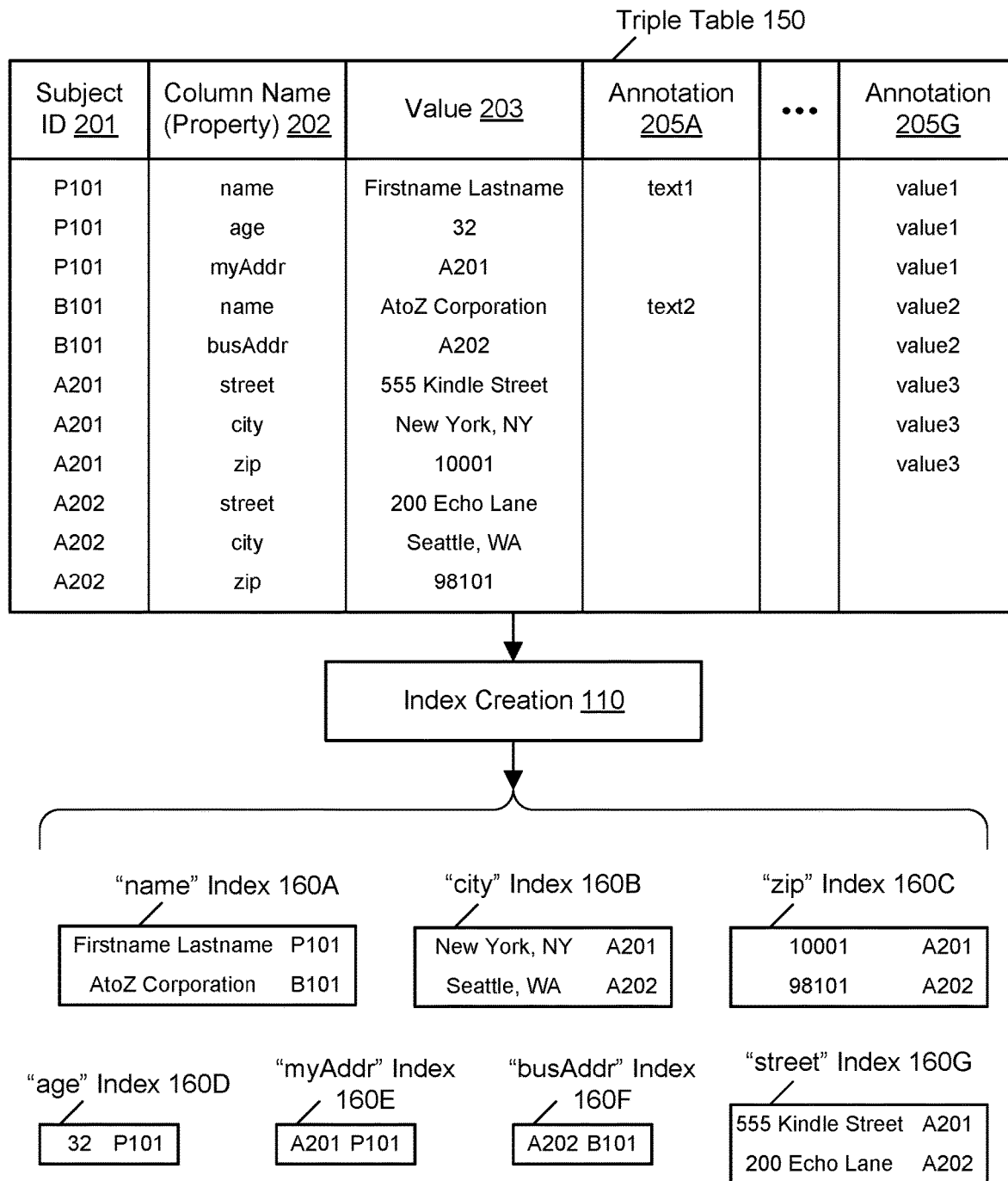

In various embodiments, the data elements in the graph database may include elements in addition to the subject identifiers, column names (also known as properties or predicates), and values (also known as objects or relationships). In one embodiment, the data elements may be referred to as quads, e.g., when each row potentially stores four different units of data. As illustrated in FIG. 2B, in one embodiment, the data elements also include graph identifiers 204 that indicate particular graphs or sub-graphs to which the triples belong. As illustrated in FIG. 2C, in one embodiment, the data elements also include one or more types of annotations 205A-205G. In one embodiment, the triple table 150 stores annotations that characterize aspects of the triples, such as the values in the triples. As shown in the example of FIG. 2C, in one embodiment, a series of annotation fields such as annotation 205A through 205G may be stored in the triple table. However, any suitable number and configuration of annotation fields may be used in the graph database in various embodiments. In various embodiments, the annotations may represent user-defined or user-supplied values for aspects of data such as data quality values, access rights, expiration times, and so on. In one embodiment, for a given annotation field, not all of the triples or rows may include a value for that annotation field. In the example shown in FIG. 2C, in one embodiment, only the "P101"—"name"—"Firstname Lastname" and "B101"—"name"—"AtoZ Corporation" triples include values for the annotation field 205A. Also in the example shown in FIG. 2C, in one embodiment, a greater number of the triples happen to have values for the annotation field 205G.

Figure 3:
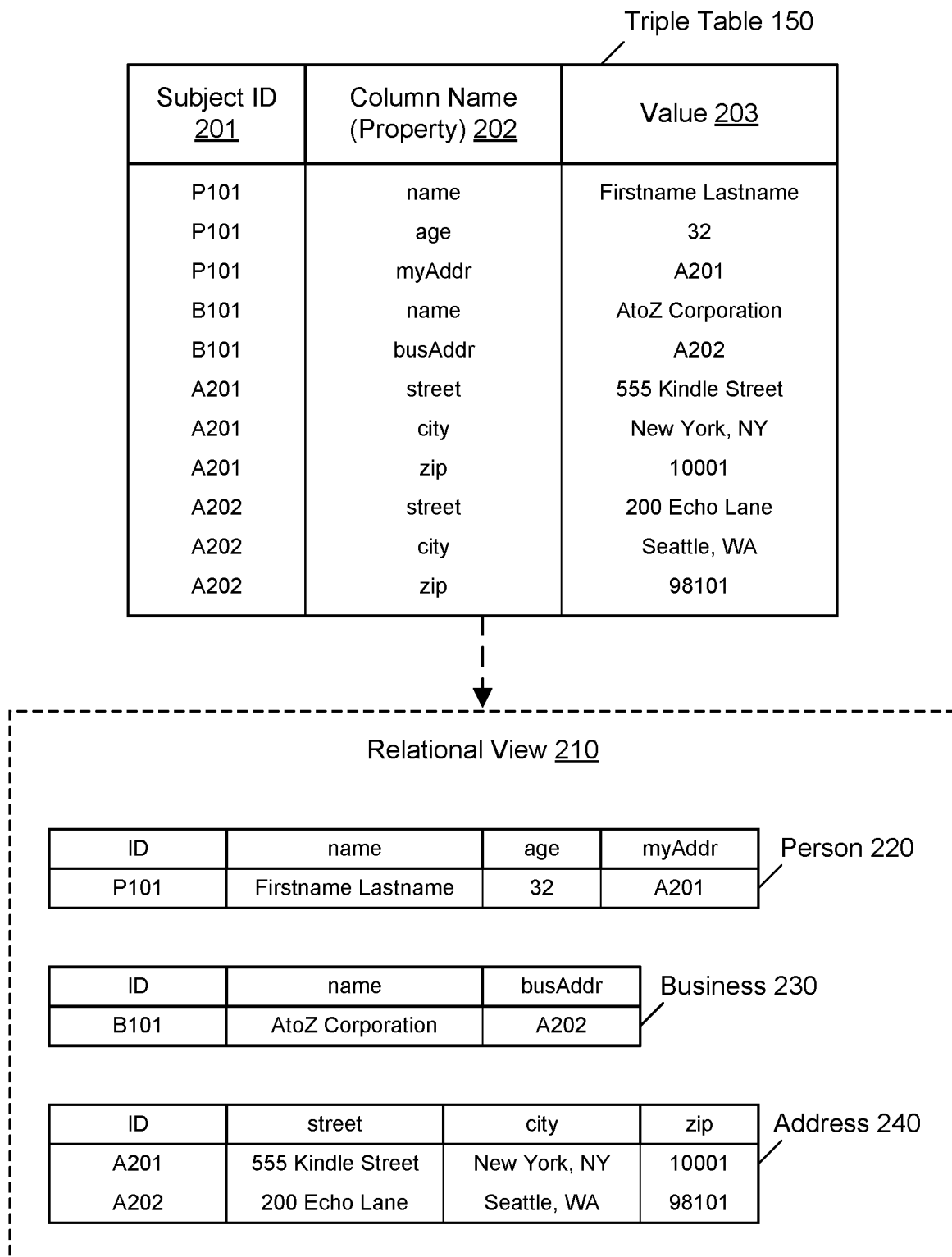
FIG. 3 illustrates an example of a graph database usable with the example system environment, including a relational view of data elements in the graph database, according to one embodiment.

FIG. 3 illustrates an example of a graph database usable with the example system environment, including a relational view of data elements in the graph database, according to one embodiment. In one embodiment, the graph database is sufficiently flexible to describe rich interrelated object and relationship centric data while also achieving query performance using property-scoped, strongly typed indices. In one embodiment, as shown in the example of FIG. 3, the graph database may reflect or represent a relational view 210 of data along with its associated per-column, property-scoped indices. In one embodiment, for example, the rows including identifier P101 may represent a row in the relational view for a particular person 220 having properties such as the name "Firstname Lastname," the age 32, and the personal address (myAddr) A201. Similarly, in one embodiment, the rows including identifier B101 may represent a row in the relational view for a particular business 230 having properties such as the name "AtoZ Corporation" and a business address (busAddr) A202. In one embodiment, the relational view may also include a table for the addresses 240 referenced in the person 220 and business 230 rows.

Figure 4:
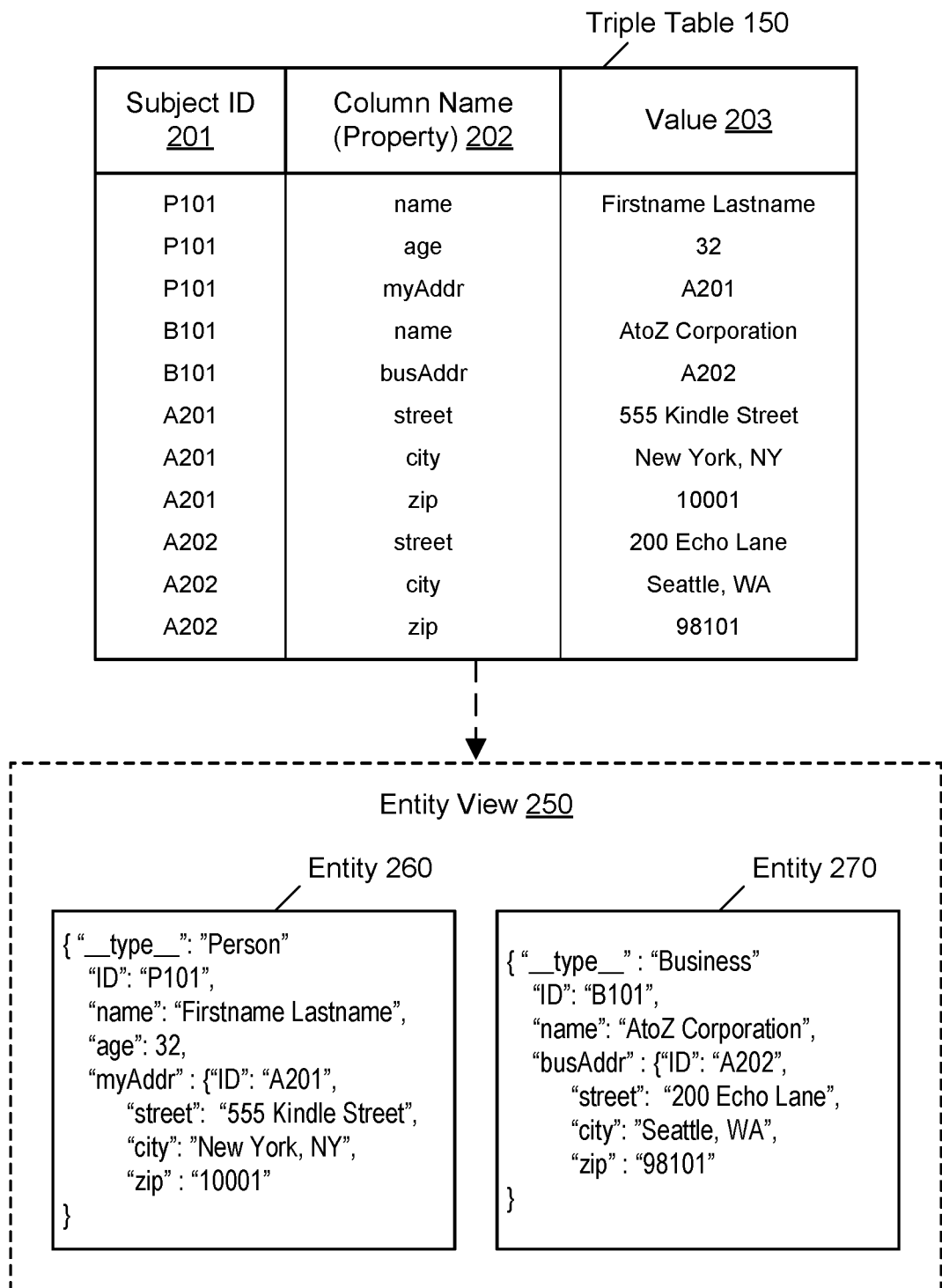
FIG. 4 illustrates an example of a graph database usable with the example system environment, including an entity view of data elements in the graph database, according to one embodiment.

FIG. 4 illustrates an example of a graph database usable with the example system environment, including an entity view of data elements in the graph database, according to one embodiment. In one embodiment, the graph database may reflect or represent an entity view 250 of data along with its associated per-column, property-scoped indices. In one embodiment, the entity view may include one or more entities expressed according to JavaScript Object Notation (JSON). In one embodiment, for example, the rows including identifier P101 may represent an entity 260 in the entity (JSON) view for a particular person having properties such as the name "Firstname Lastname," the age 32, and the personal address (myAddr) A201 with nested values for a city, street, and zip code. Similarly, in one embodiment, the rows including identifier B101 may represent another entity 270 in the entity (JSON) view for a particular business having properties such as the name "AtoZ Corporation" and a business address (busAddr) A202 with nested values for a city, street, and zip code.

Figure 5:
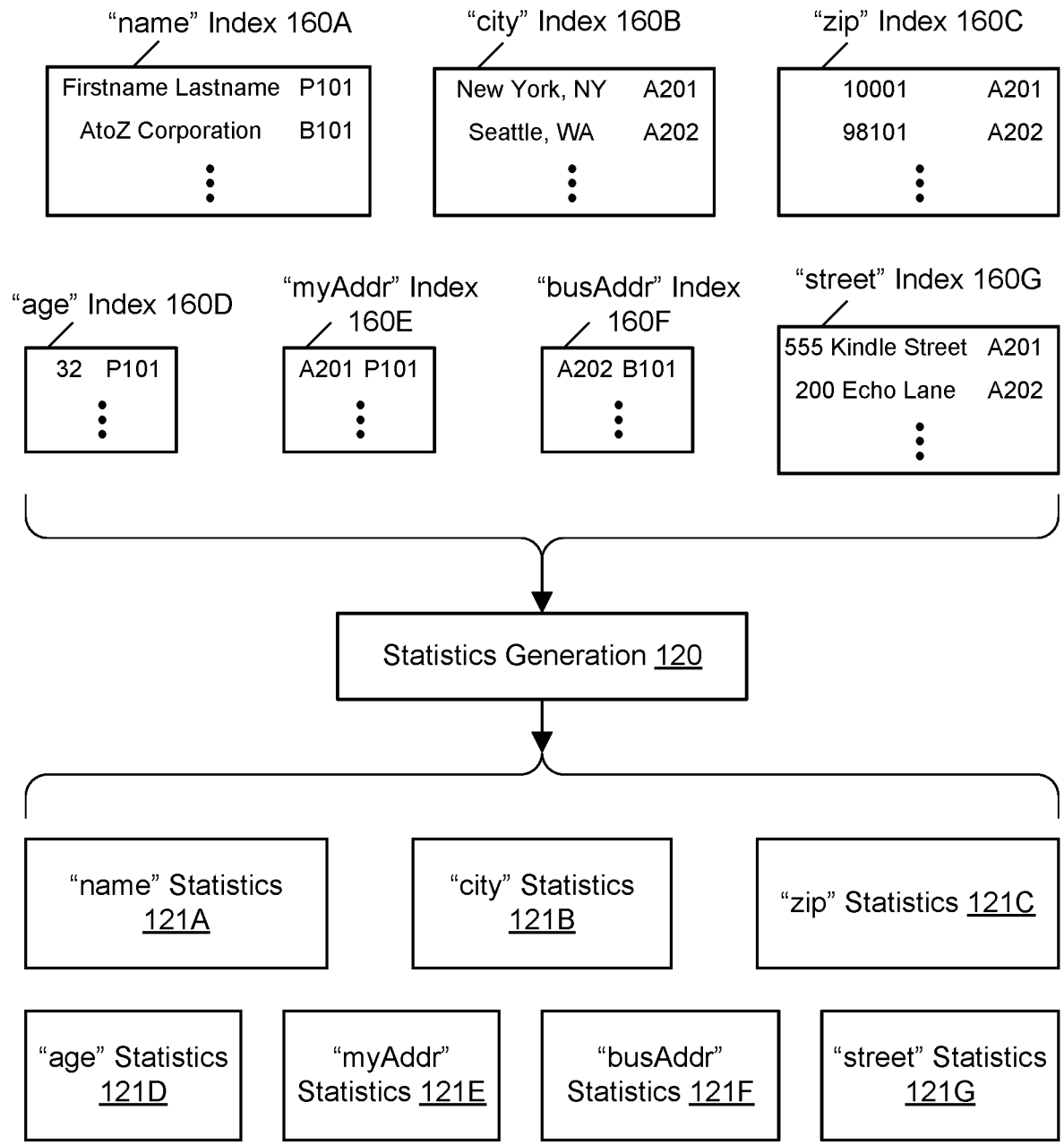
FIG. 5 illustrates the generation of statistics associated with per-column indices for globally scoped column names, according to one embodiment.

FIG. 5 illustrates the generation of statistics associated with per-column indices for globally scoped column names, according to one embodiment. As previously shown in the example of FIG. 2, in one embodiment, the index creation component may create and maintain a "name" index 160A corresponding to the column name or property "name," a "city" index 160B corresponding to the column name or property "city," a "zip" index 160C corresponding to the column name or property "zip," an "age" index 160D corresponding to the column name or property "age," a "myAddr" index 160E corresponding to the column name or property "myAddr," a "busAddr" index 160F corresponding to the column name or property "busAddr," and a "street" index 160G corresponding to the column name or property "street." In one embodiment, the statistics generation component generates and maintains statistics for the indices 160A-160G in order to optimize queries. In one embodiment, the statistics are incrementally generated by being updated periodically as triples are added, deleted, or modified. In one embodiment, the statistics generation component generates and maintains sets of statistics corresponding to individual indices, such as statistics 121A-121G corresponding to the indices 160A-160G. In one embodiment, the statistics may be stored using any suitable storage technologies, e.g., in storage managed by or otherwise accessible to the graph database service. In one embodiment, the statistics for an index may represent distributions of values within the corresponding column. In one embodiment, for example, the statistics may indicate how many times a particular value occurs within the column, how many triples having numeric values within a particular numeric range occur within the column, how many triples having string-typed values beginning with a particular character occur within the column, and so on.

In one embodiment, to optimize a query, the order of indices to be used may be determined based (at least in part) on the statistics 121A-121G for the per-column indices 160A-160G. In one embodiment, the query planner uses the most constraining index first, then the next most constraining index, and so on. In one embodiment, the statistics may be maintained in real time or near-real time to enable optimized query processing using up-to-date information. In one embodiment, the generation and maintenance of statistics for an index is performed by the graph database service automatically, e.g., without being directly prompted by user input directing the statistics tasks. In one embodiment, an index and the corresponding statistics for the index are updated by the graph database service in response to the updating of one or more triples for the corresponding column in the graph database (e.g., the addition of one or more triples, the deletion of one or more triples, or the modification of one or more triples).

Figure 6:
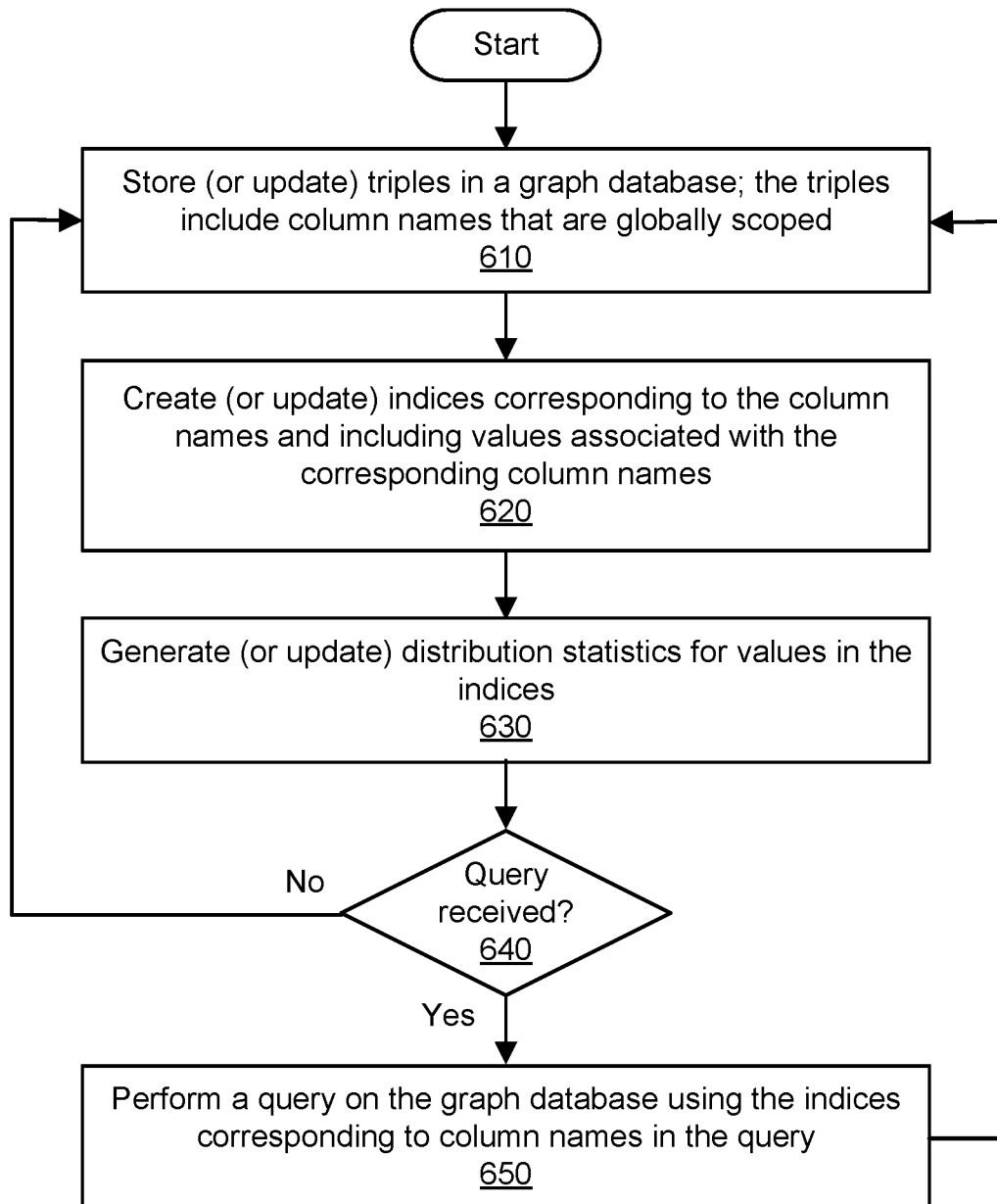
FIG. 6 is a flowchart illustrating a method for global column indexing in a graph database, according to one embodiment.

FIG. 6 is a flowchart illustrating a method for global column indexing in a graph database, according to one embodiment. In one embodiment, as shown in 610, elements of data may be stored or updated in a graph database. In one embodiment, the elements of data in the graph database may represent triples or rows in a columnar format. In one embodiment, for example, a triple may include an identifier, a column name, and a value. In one embodiment, triples may include different elements than (e.g., in addition to or instead of) an identifier, column, name, and value. In one embodiment, the identifier may also be referred to as a subject identifier. In one embodiment, the identifier may indicate the particular row (e.g., in a relational view of the data) or record that holds the combination of the column name and the value in the triple. In one embodiment, the same subject identifier may be reused for multiple triples, e.g., if the corresponding row or record includes values in multiple categories. In one embodiment, the column name may indicate a distinct and separate category of data, and the value may represent one of the allowable values within the category. In one embodiment, the triples in a graph database may be used to represent nodes and edges (relationships) in a graph of connected items. In one embodiment, the graph database may store one graph or multiple graphs. In one embodiment, the triples are also stored with graph identifiers that indicate particular graphs to which the triples belong.

In one embodiment, columns are strongly typed such that values in a particular column may share the same data type, and an enforcement mechanism may ensure that values in the particular column are limited to being expressed in the data type associated with the column. In one embodiment, data types may differ from column to column. In one embodiment, all the rows and columns in the graph database may effectively belong to the same primary table. In one embodiment, column names are globally scoped in the graph database, such that the same column name may not be represented more than once in the graph database and may not be limited to a particular sub-table of the graph database.

In one embodiment, by way of contrast, column names in a conventional relational database are typically locally scoped to one of many tables.

In one embodiment, as shown in 620, indices may be created or updated for the globally scoped columns in the primary table in the graph database. In one embodiment, indices are created and maintained for many but not necessarily all global columns in the primary table in the graph database, e.g., for columns that are intended to be queryable or searchable. In one embodiment, a per-column index may be a table or other columnar data structure that includes multiple rows, and each row may include the values associated with the column corresponding to the index. In one embodiment, a per-column index may also be referred to as a property-scoped index. In one embodiment, each row in a per-column index also includes a pointer to the row in the primary table in the graph database. In one embodiment, the indices may be stored as separate data structures from each other and from the primary table, e.g., in storage managed by or otherwise accessible to the graph database service. In one embodiment, the indices may effectively be partitioned by column name. In one embodiment, by way of contrast, such per-column indexing in a conventional relational database would often be prohibitively expensive due to the vastly greater number of locally scoped columns that may be managed in a relational database management system. In one embodiment, the generation and maintenance of indices is performed by the graph database service automatically, e.g., without being directly prompted by user input directing the indexing tasks. In one embodiment, by way of contrast, the generation and maintenance of indices for a conventional relational database is typically a manual task that requires user input to customize the indices.

In one embodiment, as shown in 630, statistics may be generated or updated incrementally for the indices, e.g., in order to optimize queries. In one embodiment, the statistics may be stored using any suitable storage technologies, e.g., in storage managed by or otherwise accessible to the graph database service. In one embodiment, the statistics for an index may represent distributions of values within the corresponding column. In one embodiment, for example, the statistics may indicate how many times a particular value occurs within the column, how many triples having numeric values within a particular numeric range occur within the column, how many triples having string-typed values beginning with a particular character occur within the column, and so on. In one embodiment, the statistics may be maintained in real time or near-real time to enable optimized query processing using up-to-date information. In one embodiment, the generation and maintenance of statistics for an index is performed by the graph database service automatically, e.g., without being directly prompted by user input directing the statistics tasks. In one embodiment, an index and the statistics for the index are updated by the graph database service in response to the updating of one or more triples for the corresponding column in the graph database (e.g., the addition of one or more triples, the deletion of one or more triples, or the modification of one or more triples).

In one embodiment, as shown in 640, it may be determined whether a query has been received, e.g., from a client or any user who has suitable access privileges to submit a query to the graph database service. If not, then in one embodiment, the method may await update requests to the graph database and eventually return to 610 to perform the updates (e.g., the addition of one or more triples, the deletion of one or more triples, or the modification of one or more triples). In one embodiment, if a query has been received, then as shown in 650, the query may be performed on the graph database. In one embodiment, the query is performed (e.g., by a query planner) using the indices corresponding to column names associated with the query. In one embodiment, to optimize a query, the order of indices to be used may be determined based (at least in part) on the statistics for the per-column indices. In one embodiment, the query planner uses the most constraining index first, then the next most constraining index, and so on. In one embodiment, the query may return one or more data elements from the graph database, potentially including one or more of the values.

Illustrative Computer System

In one embodiment, a computer system that implements a portion or all of one or more of the technologies described herein may include a computer system that includes or is configured to access one or more computer-readable media. FIG. 7 illustrates such a computing device 3000 in one embodiment. In one embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In various embodiments, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In one embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. In one embodiment, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in some embodiments, program instructions and/or data may be received, sent or stored upon different types of computer-readable media. In one embodiment, generally speaking, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. In one embodiment, the term "computing device" refers to at least all these types of devices, and is not limited to these types of devices.

The various methods as illustrated in the Figures and described herein represent examples of embodiments of methods. In various embodiments, the methods may be implemented in software, hardware, or a combination thereof. In various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention; the first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more processors and one or more memories to store computer-executable instructions that, when executed, cause the one or more processors to:
      store a plurality of items of a database configured to store information corresponding to graphs, wherein individual items of the database comprise at least a property and a value for the property, wherein more than one item of the database comprises a same particular property, and wherein individual properties of the items are associated with a respective data type for the corresponding values for the property, such that all the values for the particular property of the database share the same data type that is associated with the particular property;
      create an index corresponding to at least one property of the properties, wherein the index comprises one or more of the values associated with the at least one property; and
      perform a query on the database, wherein the query is associated with the at least one property, and wherein the query on the database is performed using the index corresponding to the at least one property associated with the query.

2. The system as recited in claim 1, wherein the query is performed by a database service responsive to a request from a client, and wherein the query identifies one or more anomalous activities.

3. The system as recited in claim 1, wherein the query is performed by a database service responsive to a request from a client, and wherein the query is used to generate one or more recommendations.

4. The system as recited in claim 1, wherein the database stores streaming data.

5. The system as recited in claim 1, wherein the properties comprise data about vertices and edges of a property graph.

6. The system as recited in claim 1, wherein the items comprise one or more annotations.

7. A method, comprising:
   storing a plurality of items of a database configured to store information corresponding to graphs, wherein individual items of the database comprise at least a property and a value for the property, wherein more than one item of the database comprises a same particular property, and wherein individual properties of the items are associated with a respective data type for the corresponding values for the property, such that all the values for the particular property of the database share the same data type that is associated with the particular property;
   creating an index corresponding to at least one property of the properties, wherein the index comprises one or more of the values associated with the at least one property; and
   performing a query on the database, wherein the query is associated with the at least one property, and wherein the query on the database is performed using the index corresponding to the at least one property associated with the query.

8. The method as recited in claim 7, wherein the query is performed by a database service responsive to a request from a client, and wherein the query identifies one or more anomalous activities.

9. The method as recited in claim 7, wherein the query is performed by a database service responsive to a request from a client, and wherein the query is used to generate one or more recommendations.

10. The method as recited in claim 7, wherein the database stores streaming data.

11. The method as recited in claim 7, wherein the properties comprise data about vertices and edges of a property graph.

12. The method as recited in claim 7, wherein the items comprise one or more annotations.

13. The method as recited in claim 7, further comprising performing graph analytics associated with the database.

14. One or more non-transitory computer-readable storage media storing program instructions that, when executed on or across one or more processors, cause the one or more processors to implement:
   storing a plurality of items of a database configured to store information corresponding to graphs, wherein individual items of the database comprise at least a property and a value for the property, wherein more than one item of the database comprises a same particular property, and wherein individual properties of the items are associated with a respective data type for the corresponding values for the property, such that all the values for the particular property of the database share the same data type that is associated with the particular property;
   creating an index corresponding to at least one property of the properties, wherein the index comprises one or more of the values associated with the at least one property; and performing a query on the database, wherein the query is associated with the at least one property, and wherein the query on the database is performed using the index corresponding to the at least one property associated with the query.

15. The one or more non-transitory computer-readable storage media as recited in claim 14, wherein the query is performed by a database service responsive to a request from a client, and wherein the query identifies one or more anomalous activities.

16. The one or more non-transitory computer-readable storage media as recited in claim 14, wherein the query is performed by a database service responsive to a request from a client, and wherein the query is used to generate one or more recommendations.

17. The one or more non-transitory computer-readable storage media as recited in claim 14, wherein the database stores streaming data.

18. The one or more non-transitory computer-readable storage media as recited in claim 14, wherein the properties comprise data about vertices and edges of a property graph.

19. The one or more non-transitory computer-readable storage media as recited in claim 14, wherein the items comprise one or more annotations.

20. The one or more non-transitory computer-readable storage media as recited in claim 14, further comprising additional program instructions that, when executed on or across the one or more processors, cause the one or more processors to implement performing graph analytics associated with the database.

* * * * *